Patented June 16, 1953

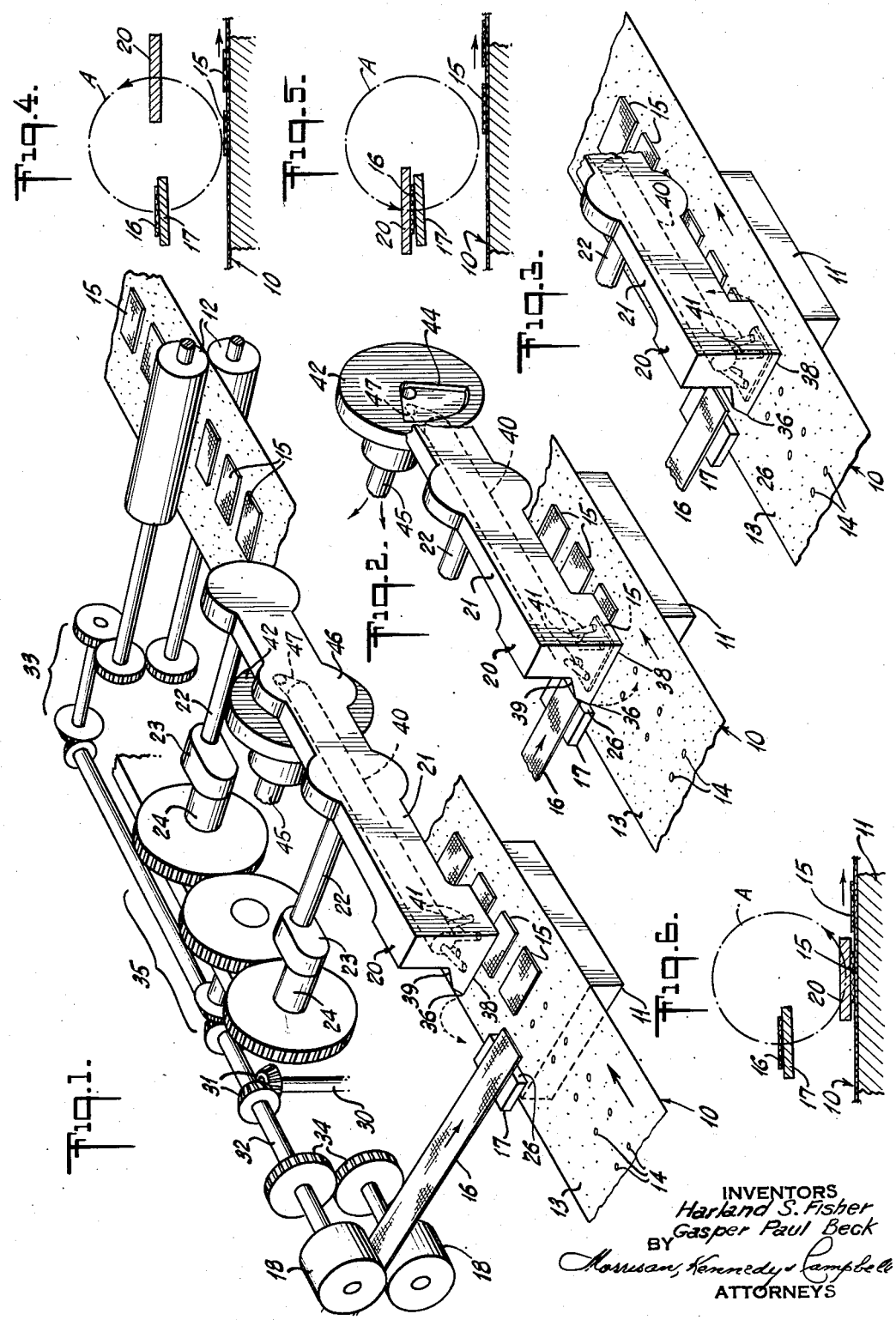

2,642,116

UNITED STATES PATENT OFFICE 2,642,116

BANDAGE CUTTING AND ASSEMBLING MACHINE

Harland S. Fisher, Metuchen, and Gasper Paul Beck, Highland Park, N. J., assignors to Johnson & Johnson, a corporation of New Jersey Application June 7, 1950, Serial No. 166,746

19 Claims. (Cl. 154—1.6)

The present invention relates to a machine for cutting flexible material into sections and applying them to a continuous strip and, although it has a wide range of utility, it is particularly useful in connection with a machine for cutting and assembling the different parts of an adhesive bandage.

The ordinary adhesive bandage unit comprises an adhesive bandage tape of rectangular oblong shape and a small rectangular pad of gauze laid on the adhesive side of the tape centrally between its ends and sides. The conventional type of automatic or production machine for cutting a strip of gauze into individual pads and for laying them upon an adhesive bandage strip to be cut later into units, requires reciprocating and intermittent movements of its parts. The intermittent stopping of these parts in the operation of the machine, not only reduces its output but creates inertial stresses inducive of vibrations and requiring heavy structure to withstand.

One object of the present invention is to provide a machine which cuts a strip of gauze into pads and applies them in proper accurate position to an adhesive bandage strip and which has its parts continuously operable in a manner to allow high speed production with minimum of operational stresses.

In carrying out certain features of the invention, the machine employs rotary and continuous motions entirely. To that end, the gauze strip is fed continuously endwise over a fixed cutting block and through the field of action of a cutter operated continuously and cyclically along a closed path, to cut this strip transversely into successive pads, while the adhesive bandage strip is moving continuously at right angles to the incoming gauze strip. The gauze strip may be limp, in which case its end section overhanging the cutting block has a tendency to droop. To maintain during cutting operations the overhanging section of the gauze strip in raised aligned position with respect to the body of the strip resting on the cutting block and to carry this gauze strip section after it is cut to the moving adhesive bandage strip, the face of the cutter confronting the face of the overhanging gauze section is in cyclic communication with a source of vacuum. As the cutter moves into position to cut the overhanging section of the gauze strip, vacuum communication with the face of the cutter is established, so that this gauze strip section is drawn up against the cutter face and is maintained thereagainst during the cutting operation. The cyclic course of the cutter carries it into position to lay the cut gauze strip section adhering to its vacuumized face onto the moving adhesive bandage strip in proper relation to its opposite edges and to the last deposited gauze strip section. As the gauze strip section is so deposited on to the sticky face of the adhesive strip, the vacuum is cut off, to permit the cutter to resume its cycle, while this gauze strip section remains attached to the bandage strip.

Various other objects, features and advantages of the invention are apparent from the following particular description and from an inspection of the accompanying drawings, in which:

Fig. 1 is a perspective view, somewhat diagrammatic, of the machine embodying the present invention, the parts being shown during the phase when the cutter is moving towards gauze strip cutting position;

Fig. 2 is a fragmentary perspective view of the gauze strip cutting mechanism shown during the phase just after completion of the gauze strip cutting operation;

Fig. 3 is a fragmentary perspective view similar to that of Fig. 2, but shows the cutting mechanism during the phase when the cut gauze strip section in the form of a pad is being deposited onto the adhesive bandage strip and the vacuum is being cut off from the pad carrying cutter face;

Fig. 4 is a sectional diagram showing the relationship of the movable cutter with respect to the fixed cutting block, at the instant shown in Fig. 1 when the cutter is moving towards cutting position;

Fig. 5 is a sectional diagram showing the relationship of the movable cutter with respect to the fixed cutting block, at the instant the cutter is beginning to cut the gauze strip; and Fig. 6 is a sectional diagram showing the relationship of the movable cutter with respect to the fixed cutting block at the instant shown in Fig. 3, while the gauze pad is being deposited onto the adhesive bandage strip.

Referring to the drawings, there is shown a continuous adhesive bandage strip 10, which is fed continuously and horizontally from a supply spool or cylinder (not shown) over a bed plate or support 11 by pull rolls 12. This strip 10 comprises a fabric backing covered on its upper face with an adhesive layer 13 and having two rows of vent holes 14 extending therealong. The width of this strip 10 conforms with the length of the bandage tape units cut therefrom.

Gauze pads 15 are laid along the adhesive bandage strip 10 at equally spaced intervals therealong centrally between its sides, and each pad is positioned centrally over a corresponding pair of transversely aligned ventilating holes 14. The adhesive bandage strip 10 with the gauze pads 15 laid thereon is moved continuously endwise to a suitable cutter (not shown), where it is severed transversely midway between adjacent pads to form the individual bandage units.

The gauze pads 15 are cut from a continuous gauze strip 16 fed from a supply spool or cylinder (not shown) continuously endwise over a fixed cutting block 17 by means of feed rolls 18. The gauze strip 16 is advanced horizontally over the adhesive bandage strip 10 in a direction at right angles thereto and into the field of action of a movable cutter 20, where it is cut into the individual pads 15.

As a feature of the present invention, the cutter 20 is moved over the gauze strip 16 in a plane at right angles to the plane of movement of the gauze strip 16 and through recurrent cycles involving continuous movement of the cutter. In the specific form shown, the cutter 20 is integral or otherwise secured to one end of a link arm 21 pivotally connected by crank pins 22 through bearings (not shown) to a pair of parallel cranks 23 of equal lengths secured to respective shafts 24 parallel to the direction of feed of the gauze strip 16. The link arm 21 serves as a parallel rod for the double crank system and the resulting parallel motion causes the cutter 20 to follow a closed path and more specifically a circular path A as shown in Fig. 4. The cutter 20 thereby moves continuously without the intermittent stoppages incident to the usual reciprocating operation.

The fixed cutting block 17 is disposed on one side of the cutting path A of the movable cutter 20, while the adhesive bandage strip 10 traverses the bottom of this path. The cutter 20 during its circular movement cuts the end section of the gauze strip 16 overhanging the fixed cutting block 17 and carries it to the adhesive bandage strip 10 to be deposited thereon in a manner to be described. The cutting block 17 has its shearing edge 26 inclined slightly downwardly away from the movable cutter 20, to cooperate progressively with the cutting edge of the cutter for cutting action, in the manner of a pair of scissors.

The continuous feed of the adhesive bandage strip 10 and the continuous feed of the gauze strip 16 are synchronized by any suitable means with the continuous operation of the cutter 20. In the drawings, the tie-up between the transmissions to the different parts of the device is shown diagrammatically, for purposes of illustration, as comprising a main drive shaft 30 having a bevel-gear connection 31 to a countershaft 32. This countershaft 32 drives the pull rolls 12 for the adhesive bandage strip 10 through a gear transmission 33, drives the feed rolls 18 for the gauze strip 16 through a gear transmission 34, and drives the crankshafts 24 for the cutter 20 through a gear transmission 35.

The cutter 20 presents a cutting edge 36 cooperable with the cutting edge 26 of the cutting block 17, to shear off the end portion of the gauze strip 16 overhanging the block, and a downwardly facing surface 38 substantially parallel to the direction of feed of the gauze strip 16 and to the bandage strip 10 and confronting the face of the overhanging gauze strip portion during cutting action. This cutter surface 38, as a result of the parallel motion mechanism operating the cutter 20, moves parallelly and serves as suctorial means for carrying the cut gauze portion into proper position to be deposited on to the adhesive bandage strip 10, as will be described.

To permit the continuous feeding of the gauze strip 16 without interference from the cutter 20 during the part of the cutter cycle after cutting and while the cutter is still opposite the advancing strip, the cutter has its cutting edge 36 extending beyond the main body of the cutter to provide a recess 39 facing the strip 16. This recess 39 is adapted to provide a clearance for the advancing end section of the gauze strip 16 during this part of the cutter cycle.

After the end section of the gauze strip 16 overhanging the cutting block 17 is cut to form a pad 15, it must be carried to the advancing adhesive strip 10 and deposited thereon in proper position with respect to the last deposited gauze pad 15. For that purpose, the surface 38 of the cutter 20 is vacuumized cyclically by means comprising a duct 40 extending along the length of the combined cutter 20 and parallel arm 21 and communicating at one end with a series of canals or holes 41 extending to the cutter surface. At its other end, the duct 40 communicates cyclically with a source of vacuum through a valve 42 controlled by the operation of the cutter 20. In the specific form shown diagrammatically, the valve 42 is in the form of a fixed disc having a segmental port opening 44 communicating with a suction line 45 leading from a suction pump (not shown) or other suitable source of vacuum. The parallel arm 21 has a flat disc section 46 in face sealing contact with the fixed valve disc 42. The vacuum duct 40 connects with the valve contacting face of the arm section 46 through a port 47 passing cyclically in communication with the segmental port opening 44 of the valve disc 42.

The segmental port opening 44 is so located and its angle is such that (1) communication is established between the cutter face 38 and the source of vacuum just before the cutter 20 starts the cutting part of its cycle, (2) this vacuum communication is maintained until the cut gauze strip section has been deposited onto the adhesive bandage strip 10, and (3) this communication with this vacuum source is cut off after the cut gauze strip section has been laid onto the adhesive bandage strip 10.

In the operation of the machine, while the adhesive bandage strip 10 is being fed continuously endwise at a constant rate towards the right (Fig. 1), the gauze strip 16 is being fed continuously endwise and forward at a related constant rate over the fixed cutting block 17 and at right angles to said bandage strip. At the same time, the movable cutter 20 is operating continuously along the circular path A as shown in Fig. 4. At the instant shown in Figs. 1 and 4, the movable cutter 20 in its path A is approximately diametrically opposite the cutting block 17, and is moving counterclockwise. At that instant, the face 38 of the cutter 20 is out of communication with the source of vacuum. When the cutter 20 reaches approximately cutting position over the overhanging end section of the gauze strip 16, as shown in Fig. 5, the port 47 in the parallel arm 21 comes into communication with the segmental port opening 44 of the valve disc 42, so that the face 38 of the cutter confronting the face of this strip section becomes vacuumized. This draws up the overhanging end section of the gauze strip 16 against this surface, especially if it has been drooping because of the flexibility of the strip. The overhanging end section of the gauze strip 16 is thereby held in aligned position with respect to the section supported on the cutting block 17, and effective cutting action is assured. At the completion of the cutting action, the cut gauze pad 15 will adhere firmly to the vacuumized surface 38 of the cutter 20, as shown in Fig. 2. As the cutter 20 continues its counterclockwise movement along the circular path A, the gauze strip 16 continues to be fed endwise and therefore projects beyond the cutting block 17. The recess 39 in the movable cutter 20 affords the necessary clearance for the projecting end of the strip, while the cutter is opposite the gauze strip 16.

The cutter 20 continues its circular movement along the path A, with the cut gauze pad 15 adhering to its vacuumized face 38, until the cutter reaches the bottom of this path, as shown in Figs. 3 and 6. At that instant, the adhesive on the bandage strip 10 takes hold of the gauze pad 15. At the same time, or just prior thereto, the port 47 in the parallel arm 21 moves out of communication with the segmental port opening 44 of the valve disc 42, so that the pad 15 is deposited onto the bandage strip 10 and the cutter 20 can continue on its circular path. The bed plate 11, of course, supports the bandage strip 10 as the gauze pad is deposited thereon, providing enough pressure to assure the firm attachment of the pad to the adhesive face of the strip.

As it continues on its circular path A, the outer end of the cutter 20 moves entirely out of the path of the oncoming gauze strip 16, so that the continuous movement of this strip is not interfered with.

The speed of the different operating parts of the machine are so correlated as to cut the gauze pads 15 of the right size and to deposit them on the adhesive bandage strip 10 in the proper spaced relationship. The adhesive bandage strip 10, with the gauze pads 15 thereon, is later cut transversely midway between adjoining pads to form the individual bandage units.

Since the different operating parts move continuously in a circular path without interruption, high speed production is possible with minimum of vibration and stresses and with lighter construction. Moreover, because of the design of the cutter 20 and the cutting block 17 and the shearing action effected therebetween when their opposed cutting edges are brought together, these members have self-sharpening characteristics which give them a long life. In addition, the machine cuts and places the gauze pads 15 on to the moving adhesive bandage strip 10 with a high degree of accuracy and uniformity.

What is claimed is:

1. A bandage cutting and assembling machine comprising, in combination, means for advancing an adhesive bandage strip continuously endwise, means for advancing a gauze strip continuously endwise in a direction substantially at right angles to the direction of movement of the bandage strip, means for cutting the advancing gauze strip transversely into successive pads, and means for carrying the pads successively as they are cut onto the advancing bandage strip for attachment thereto in predetermined spaced relationship therealong.

2. A bandage cutting and assembling machine comprising, in combination, means for advancing an adhesive bandage strip continuously endwise and substantially horizontally with its adhesive surface facing upwardly, means for advancing a gauze strip continuously endwise above the bandage strip and substantially horizontally at right angles to the direction of movement of the bandage strip, means for cutting the advancing gauze strip transversely into successive pads, and means for carrying the pads successively as they are cut onto the adhesive surface of the advancing bandage strip for attachment thereto in predetermined spaced relationship therealong.

3. A bandage cutting and assembling machine comprising, in combination, means for advancing an adhesive bandage strip continuously endwise, means for advancing a gauze strip continuously endwise, a cutter having a cutting edge for severing the advancing gauze strip transversely into successive pads, means for moving the cutter continuously along a circular path taking said cutter cyclically into and out of cutting position with respect to the advancing gauze strip while maintaining its cutting edge in a plane substantially at right angles to the direction of feed of the gauze strip, and means for applying the pads successively onto and in predetermined spaced relationship along the advancing bandage strip.

4. In a machine for cutting a continuous flexible strip transversely into sections, the combination comprising a fixed cutting block having a cutting edge, means for advancing the strip continuously endwise over the cutting block, a cutter having a cutting edge adapted to cooperate with the cutting edge on the cutting block for severing the advancing strip into sections, and means for cyclically moving the cutter in a plane substantially at right angles to the direction of advancement of the strip and continuously along a closed circuit taking the cutter alternately into and out of cutting position, the cutting edge on the cutter projecting beyond the main body of the cutter to define a clearance recess in position to face the advancing strip during a portion of each cutter cycle after cutting action.

5. In a machine for cutting a continuous flexible strip transversely into sections, the combination comprising a fixed cutting block having a cutting edge, means for advancing the strip endwise over the cutting block and across its cutting edge, a cutter having a cutting edge adapted to cooperate with the cutting edge of the block for severing the strip into pads and having also a surface adjacent to the cutting edge of the cutter, means for moving the cutter cyclically between strip cutting position in which the cutter surface faces the end section of the strip overhanging the cutting edge of the block and pad discharge position, while maintaining the cutting edge of the cutter in a plane substantially at right angles to the direction of advancement of the strip across the cutting edge of the cutting block, means for attaching the pads as they are cut from the strip onto the cutter surface, whereby the pads are carried by said cutter surface from cutting position to discharge position, and means for releasing the pad from the cutter surface at the discharge position of the cutter.

6. In a machine for cutting a continuous flexible strip transversely into sections, the combination comprising a fixed cutting block having a substantially horizontal cutting edge, means for advancing the strip endwise substantially horizontally over the cutting block and across its cutting edge, a cutter having a cutting edge adapted to cooperate with the cutting edge of the block for severing the strip into pads and having a substantially flat surface adjacent to the cutting edge of the cutter, means for moving the cutter cyclically between strip cutting position in which the cutter surface lies directly over the horizontal unsupported end section of the strip overhanging the cutting edge of the block and pad discharge position, means for attaching the overhanging section of said strip to said cutter surface as said section is cut to prevent said section from drooping and to carry the cut pad with said cutter towards discharge position, and means for releasing the cut pad from the cutter surface at the discharge position of the cutter.

7. A bandage cutting and assembling machine comprising in combination, means for advancing an adhesive bandage strip endwise, a fixed cutting block having a cutting edge, means for advancing a gauze strip endwise over the cutting block and across its cutting edge, a cutter having a cutting edge adapted to cooperate with the cutting edge of the block for severing the gauze strip into pads and having a surface adjacent to the cutting edge of the cutter, means for moving the cutter cyclically between gauze strip cutting position in which the cutter surface faces the end section of the gauze strip overhanging the cutting edge of the block and pad applying position in which the cutter surface extends close to the adhesive surface of the bandage strip, while maintaining the cutting edge of the cutter in a plane substantially at right angles to the direction of advancement of the gauze strip across the cutting edge of the cutting block, means for attaching the pads as they are cut from the gauze strip onto the cutter surface, whereby the pads are carried by said cutter surface from cutting position to pad applying position, and means for releasing the pad from the cutter surface in pad applying position to cause said pad to be deposited upon the bandage strip.

8. A bandage cutting and assembling machine comprising in combination, means for advancing an adhesive bandage strip endwise, a fixed cutting block having a substantially horizontal cutting edge, means for advancing a gauze strip endwise substantially horizontally over the cutting block and across its cutting edge, a cutter having a cutting edge adapted to cooperate with the cutting edge of the block for severing the gauze strip into pads and having a substantially flat surface located adjacent to the cutting edge of the cutter and extending substantially parallel to the path of advancement of the gauze strip across the cutting edge of said block, means for moving the cutter cyclically between gauze strip cutting position in which the cutter surface lies directly over the horizontal unsupported end section of the gauze strip overhanging the cutting edge of the block and pad applying position in which the cutter surface extends close to the adhesive surface of the bandage strip, means for attaching the overhanging section of said gauze strip to said cutter surface as said section is cut to prevent said section from drooping and to carry the cut pad with said cutter towards pad applying position, and means for releasing the pad from the cutter surface in pad applying position to cause said pad to be deposited upon said bandage strip.

9. A bandage cutting and assembling machine comprising in combination, means for advancing an adhesive bandage strip endwise substantially horizontally with its adhesive side facing upwardly, a fixed cutting block having a substantially horizontal cutting edge, means for advancing a gauze strip substantially horizontally above said bandage strip and edgewise across the cutting edge of said block, a cutter having a cutting edge adapted to cooperate with the cutting edge of the block for severing the gauze strip into pads and having a substantially flat downwardly facing surface adjacent to the cutting edge of the cutter, means for moving the cutter cyclically between gauze strip cutting position in which the cutter surface lies directly over the horizontal unsupported end section of the gauze strip overhanging the cutting edge of the block and pad applying position in which the cutter surface extends close to the adhesive surface of the bandage strip, while maintaining the cutting edge of the cutter in a plane substantially at right angles to the direction of advancement of the gauze strip across the cutting edge of the cutting block, means for vacuumizing the cutter surface as the cutter reaches cutting position to cause the pads as they are cut from the gauze strip to adhere to the cutter surface, and means for devacuumizing the cutter surface in pad applying position to cause the pad to be deposited onto the bandage strip.

10. A machine for cutting a strip into pads and applying them to another continuous strip, comprising in combination, means for continuously advancing a first continuous strip endwise substantially horizontally with one face turned upwardly, a fixed cutting block having a substantially horizontal cutting edge, means for continuously advancing a second continuous strip substantially horizontally above said first strip and edgewise across the cutting edge of said block in a direction substantially at right angles to the direction of movement of said first strip, a cutter having a cutting edge adapted to cooperate with the cutting edge of the block for severing the second strip into pads and having a substantially flat downwardly facing surface adjacent to the cutting edge of the cutter, means for continuously moving the cutter in a closed path between strip cutting position in which the cutter surface lies directly over the horizontal unsupported end sections of the second strip overhanging the cutting edge of the block and pad applying position in which the cutter surface extends close to the upwardly facing surface of the first strip, while maintaining the cutting edge of the cutter in a plane substantially at right angles to the direction of advancement of the second strip across the cutting edge of the cutting block, means for vacuumizing the cutter surface as the cutter reaches cutting position to cause the pads as they are cut from the second strip to adhere to the cutter surface, and means for devacuumizing the cutter surface in pad applying position to cause the pad to be deposited onto the upwardly facing surface of the first strip.

11. A bandage cutting and assembling machine comprising in combination, means for advancing an adhesive bandage strip continuously endwise and substantially horizontally with its adhesive surface facing upwardly, means for advancing a gauze strip continuously endwise above the bandage strip and substantially horizontally at right angles to the direction of movement of the bandage strip, a cutter having a cutting edge for cutting the advancing gauze strip transversely into successive pads, means for operating said cutter continuously through a closed path between the advancing gauze strip and the advancing bandage strip, while maintaining the cutter edge substantially in a plane extending along the advancing bandage strip, and means movable with said cutter for transferring the pads as they are cut from said gauze strip to said bandage strip.

12. A bandage cutting and assembling machine as defined in claim 11, wherein the means for operating said cutter includes a pair of parallel rotary cranks, and a link pivotally connecting the cranks and supporting the cutter.

13. A bandage cutting and assembling machine as defined in claim 11, wherein the means for operating said cutter includes a pair of rotary shafts parallel to the direction of feed of the gauze strip, a pair of parallel cranks of equal length on the shafts, and a parallel link arm connecting the cranks and supporting the cutter.

14. A bandage cutting and assembling machine comprising in combination, means for advancing an adhesive bandage strip endwise and substantially horizontally with its adhesive surface facing upwardly, a fixed cutting block above the path of advancement of said strip having a substantially horizontal strip supporting surface and a substantially horizontal cutting edge at one end of said surface disposed in a plane extending along the direction of advancement of said bandage strip, means for advancing a gauze strip horizontally endwise over said block surface and across the cutting edge of the block in a direction substantially at right angles to the path of advancement of said bandage strip, a cutter having a substantially horizontal cutting edge adapted to cooperate with the cutting edge on the cutting block for severing the advancing gauze strip into sections as it advances across the cutting edge of the block, means for moving the cutter in a direction to cause its cutting edge to follow a closed path located above the path of advancement of the bandage strip and in a plane extending along said latter path and passing through the field of action of the cutting edge on said block and through a region close to the path of advancement of the bandage strip, while maintaining the cutting edge of the cutter substantially horizontal in said plane, said cutter edge path having a substantially vertical tangent where the cutter edge passes through the field of action of the block, whereby said cutter edge has a vertical downward movement at the instant of cutting, and means carried by said cutter and movable therewith along said cutter edge path for transferring the pads as they are cut to the bandage strip.

15. A bandage cutting and assembling machine as defined in claim 14, wherein the closed path through which the cutter edge moves is circular.

16. In or for a machine for cutting a continuous flexible strip transversely into sections, in combination, a cutter presenting a cutting edge and a substantially flat surface extending to said cutting edge, said cutter having suction ports leading to said surface to pick up the strip sections as they are cut, and means for moving said cutter through a closed path in the plane of said edge substantially at right angles to said surface.

17. In or for a machine for cutting a continuously flexible strip transversely into sections, in combination, a cutter presenting a cutting edge and a substantially flat surface extending to said cutting edge, said cutter having suction ports leading to said surface to pick up the strip sections as they are cut, and means for moving said cutter through a circular path in the plane of said edge substantially at right angles to said surface.

18. In or for a machine for cutting a continuous flexible strip transversely into sections, a cutter presenting a cutting edge and a substantially flat surface extending to said cutting edge, said cutter having suction ports leading to said surface to pick up the strip sections as they are cut, an arm rigid with said cutter and extending in a direction substantially parallel to said cutting edge, and a pair of parallel cranks with their axes of rotation substantially parallel to said surface, pivotally connected to said arm to form a parallel motion mechanism with said arm.

19. In or for a machine for cutting a continuous flexible strip transversely into sections, a cutter presenting a cutting edge and a substantially flat surface extending to said cutting edge, a link arm rigid with said cutter and having suction conduits extending therealong from one region thereof to said surface, whereby said surface is adapted to pick up the strip sections as they are cut, means for driving said link arm in a direction to cause said cutter to move cyclically in and out of strip cutting position, and valve means at said region for controlling the suction in said conduits according to the operating cycle of said cutter.

HARLAND S. FISHER.
GASPER PAUL BECK.

References Cited in the file of this patent

UNITED STATES PATENTS

| Number | Name | Date |
|---|---|---|
| 84,306 | Sanborn | Nov. 24, 1868 |
| 907,690 | Harbeck | Dec. 22, 1908 |
| 2,128,746 | Joa | Aug. 30, 1938 |
| 2,320,092 | Miller | May 25, 1943 |
| 2,383,523 | Thornburgh | Aug. 28, 1945 |
| 2,511,559 | Banff et al. | June 13, 1950 |